United States Patent [19]

Schnabel et al.

[11] 4,411,781

[45] Oct. 25, 1983

[54] HIGH PRESSURE ULTRA-FILTRATION SYSTEM

[75] Inventors: Roland Schnabel, Hofheim; Alexander Hoelzel; Winfrid Vaulont, both of Mainz, all of Fed. Rep. of Germany

[73] Assignee: Jenaer Glaswerk Schott & Gen., Fed. Rep. of Germany

[21] Appl. No.: 2,371

[22] Filed: Jan. 10, 1979

[30] Foreign Application Priority Data

Jan. 11, 1978 [DE] Fed. Rep. of Germany ....... 2801018

[51] Int. Cl.$^{3}$ .............................................. B01D 31/00

[52] U.S. Cl. .............................. 210/195.2; 210/416.1; 210/433.2

[58] Field of Search ........ 210/23 F, DIG. 23, 500 M, 210/510, 195.2, 416.1, 433.2

[56] References Cited

U.S. PATENT DOCUMENTS 3,498,909 12/1966 Littman ............................ 210/23 H 3,853,754 12/1974 Grosser ............................. 210/23 H 3,977,967 8/1976 Trulson et al. .................... 210/23 F 4,042,359 8/1977 Schnabel et al. ......................... 65/2

*Primary Examiner*—Frank A. Spear, Jr.

*Attorney, Agent, or Firm*—Hill, Van Santen, Steadman & Simpson

[57] ABSTRACT

An apparatus for a high pressure ultra-filtration of a permeate or filtrate from a crude solution characterized by a module having an inlet for the crude solution, an outlet for the crude solution, a pressure stable capillary diaphragm as the main filtration element, means holding the diaphragm in said module, the filtration element being of a structure most favorable to the flow techniques in which the capillary diaphragms are permeated from the outside toward the inside as the crude solution flows in the axial direction therealong under a flow pressure gradient, an outlet for the permeate passing into the capillary diaphragms and means for creating a flow pressure gradient on crude material being supplied to the module. Preferably, capillary diaphragms are porous glass capillaries which are secured at one end with the other end being closed and free to adjust its position in the module.

8 Claims, 3 Drawing Figures

5 P 3 14 P 6 1

HIGH PRESSURE ULTRA-FILTRATION SYSTEM

BACKGROUND OF THE INVENTION

The present invention is directed to a high pressure ultra-filtration (HPUF) installation which allows utilizing ultra-filtration pressures as high as 100 bars at least due to the use of suitable pressure tight diaphragms.

According to the present state of the art, ultrafiltration diaphragms operate in the pressure range of up to 10 bars and the service pressure of the great majority of the installations is limited to less than 4 bars.

The reason for this is that plastic diaphragms of different basic materials are almost exclusively used, for example a cellulose acetate or polyamide, in the form of asymmetrical diaphragms. The term "asymmetrical diaphragms" is used to denote diaphragms with a thin active layer, which is decisive in the separation of materials, with a relatively thick and highly porous "back-up" layer. The mechanical strength of the diaphragm is so small that pressures in excess of the above cited pressures cannot be resisted. As the pressure across a diaphragm increases, the porous structure of the diaphragm changes together with the separating or filtering characteristics. Admittedly, the porous structure ensures a high exchange capacity, but it also results in limited mechanical strength.

In addition to the plastic diaphragms, a number of diaphragms made of graphite, which is an inorganic material, are also used. Though such diaphragms should be pressure stable up to 35 bars, the equipment in which they are fitted normally operates around 7 bars.

The main components of an ultra-filtration installation, apart from the regulator and control equipment, are pumps producing the ultra-filtration pressure and the diaphragm modules which contain the diaphragms and in which the ultra-filtrative material separation takes place. Depending on the manner in which the diaphragm material is arranged in the module, the following differentiations are made for different module structures. These module structures are grouped:

sheet membrans in "plate and frame" stack or spiral wound modules tubular membrans or tubular modules capillary modules of diaphragm capillaries which are often referred to as hollow fibers.

In plate and frame modules, the diaphragm foils are clamped between suitable backing slabs with flat membranes separating the inlet for the crude solution from the discharge or outlet for the permeate or filtrate. The backing slabs contain channels and profiles of the same or different dimensions over the entire face of the slab and these channels or profiles maintain a flow without allowing the formation of dead filtration areas.

In spiral wound modules two diaphragm foils of each type are coiled with a suitable backing web of supporting material and built into a modular tube. The inlet flow occurs through the backing web and through the two coil layers and the backing web ensures constant turbulence of the flow by constantly redirecting it. The permeate discharge occurs through the two diaphragm foils between which a further porous supporting insert is frequently wound. Tubular modules, consist of tubes with a porous drainage internal layer upon which a prefabricated diaphragm hose complex is placed or is applied directly to the diaphragm hose. The crude solution passes through the tube having a diameter in the order of centimeters and the permeate or filtrate which passes through the diaphragm is discharged through the drainage layer.

In capillary and hollow fiber modules, the capillaries or hollow fibers are bonded at the ends into a jacket using a suitable adhesive. The crude solution passes through the capillaries and the permeate or filtrate that passes through the diaphragms flows into the outer chamber.

As in all convective material exchange problems, the transfer through the diaphragm is improved when a turbulent flow is ensured. The powerful turbulent solution transport passing transversely to the flow direction carries the solution more vigorously to the diaphragms on the one hand and also ensures a good removal of the retained components on the other hand. The retained component will inhibit the permeation of the diaphragm either due to concentration build up or deposits on the diaphragm.

With the exception of tubular modules in most cases, none of the present installation operate with a turbulent flow. In many of the above cited modular designs, it is not possible to achieve a turbulent flow owing to the design and surface parameters. In some cases, a turbulent effect is simulated, for instance, by turbulence of the crude solution flow as a result of passing it through the backing web of the wound module or by introducing mixed components or turbulence promoters, for instance, in the tubular module. Nevertheless, this does not produce a genuine flow turbulence.

SUMMARY OF THE INVENTION

The present invention is directed to eliminating the disadvantages of the present ultra-filtration installations. This aim is achieved by increasing the ultra-filtration pressure up to 100 bars using suitable pressure-tight diaphragms as well as by modifying the normal ultra-filtration installations with reference to the modular design, the flow of the liquid through the modules, and the general design of the installation. This improved structure allows full exploitation of the advantages of high pressure ultra-filtration.

To accomplish these tasks, the apparatus with a high pressure ultra-filtration of a permeate from a crude solution comprises a module having an inlet for crude solution, an outlet for the crude solution, a pressure stable capillary diaphragm as the main filtration element, means holding the diaphragm in said module, said filtration element being of a structure most favorable to flow technique in which the capillary diaphragms are permeated from the outside toward the inside as the crude solution flows in an axial direction therealong under a flow pressure gradient; an outlet for the permeate passing into the capillary diaphragm and means for creating a flow pressure gradient on the crude material being supplied to the module.

The main point of the high pressure ultra-filtration process is the use of a suitable pressure resisting diaphragm. Such diaphragms are, for instance, separation diaphragms made of porous glass with a symmetrical design. These diaphragms can be produced preferably by a process set forth in U.S. Pat. No. 4,042,359. In the present invention, porous glass capillaries with an external diameter of 200-5000 μm and with a pore size in a range of 11-1000 Å have proved particularly satisfactory. This results from the flow pattern in the module which allows the permeate to pass through the wall of the capillaries and to be discharged from the interiors thereof. This permeate or filtrate flow must not have an excessive flow resistance which could result from an excessively narrow capillary. On the other hand, an overly large capillary diameter will unnecessarily increase the space requirements within the module and consequently the space requirements of the installation.

Porous glass separating diaphragms are chemically modified at the surface in accordance with the above mentioned U.S. patent. As an example, in the case of oil emulsion separation, an $NO_2$ modification has proven particularly successful. The separating diaphragms of porous glass can be varied to a wide extent in their pore geometry, in order to match the problems of the particular utilization.

As already stated, turbulent flow through the module should be sought. This is achieved with relative ease when the capillaries are being permeated coaxially from the outside. This flow direction will produce the above mentioned permeate flow into the inside of the capillaries. In this type of flow direction of the crude solution into the outer chamber of the capillaries and parallel to the capillaries, care must be taken to ensure the inlet flow of the crude solution into the module is not directed transversely at the capillaries. Where a lateral approach to the module cannot be avoided, the flow must be redirected in the module to be axially at the start of the engagement with the capillaries.

Turbulent flow must be ensured at all points within the module. This means not only that the main flow velocity within the module of a given geometry must be sufficient but also that the local velocity must not drop below a minimum level. In optimum conditions, the local velocity will be the same as the main velocity, for example ensuring a turbulent flow velocity. This also means, with respect to the module design, that a uniform cross-sectional geometry must be kept over the compete length. In particular, the capillaries must be so distributed in the cross-sectional geometry of the module that the distance between adjacent capillaries on one hand and the distance between the outer capillaries and the wall of the module on the other hand are the same. This produces equal flow throughout the entire cross section of the module and there is no preferential flow sections formed within the module, for example, at the boundary directional flow of the module.

Further constructional features facilitate the maintenance of an accurate module geometry. The capillaries are not held at both ends but the holding means only supports the capillaries at one end and the other end is closed in a suitable manner. This can be achieved by bonding or also by fusing the end of the capillary. The free end of the capillary moves freely within the module and locates itself automatically in the flow so that a uniform flow channel is achieved on all sides.

The turbulent flow along the outside of the capillaries also provides a further advantage in relation to known installations particularly with reference to internal permeated capillaries. The high speed and relatively large flow compartment which is produced when the capillary packing density does not exceed 40% for economical reasons, reduces the fouling and/or blocking risks to a minimum.

All structural details and the modules such as the service operation, for example exchanging a module insert, may be effected quickly and easily. The high pressure ultrafiltration installation must also be optimized in its overall design. Otherwise any advantage will only be lost as a result of over-proportionally increasing energy demands.

The ultra-filtration installation may be designed basically according to two principles. One is an installation with an open high pressure circuit and the other is with a closed high pressure circuit.

DESCRIPTION OF THE PREFERRED EMBODIMENTS

Figure 1:
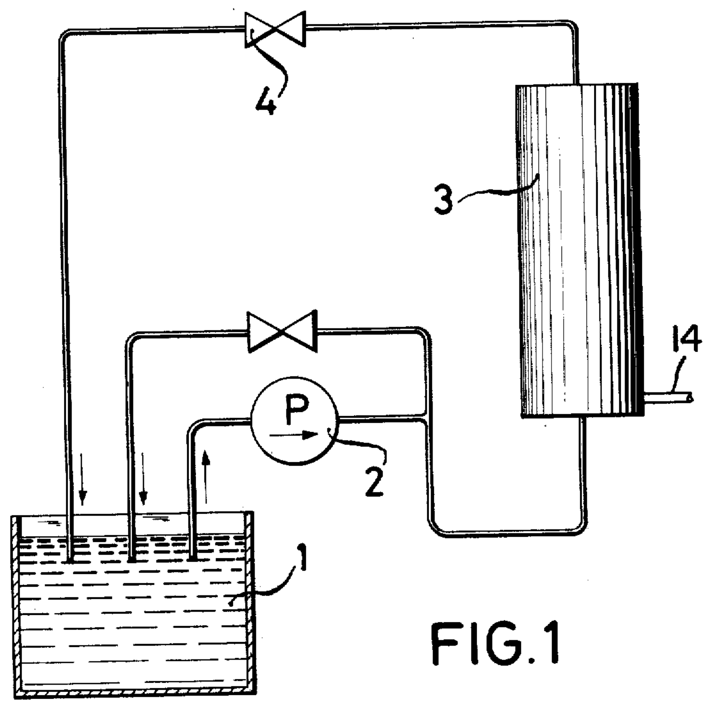
FIG. 1 is a schematic illustration of an open high pressure circuit ultra-filtration installation in accordance with the present invention.

The principles of the present invention are particularly useful in an open high pressure circuit design which is illustrated in FIG. 1. The whole flow volume required for the relevant hydrodynamic conditions in the modules is taken from a storage tank 1 by a high pressure pump 2 and applied to an inlet for the crude solution of a module 3. From an outlet for the crude solution of the module, the crude solution leaves the module 3 and passes through a throttle valve 4, which throttles the pressure back to atmospheric pressure as the solution is dumped into the tank 1. Independent of the system pressures, the relative energy applied is almost entirely cancelled and lost.

It should be noted that the module 3 is a module containing the capillary diaphragms which are held by a holding means in the module so that fluid flowing axially along the length of the capillaries will penetrate through the wall of the capillaries to the interior. It is also noted that the interiors of the capillary are in communication with the permeate or filtrate outlet 14.

Figure 2:
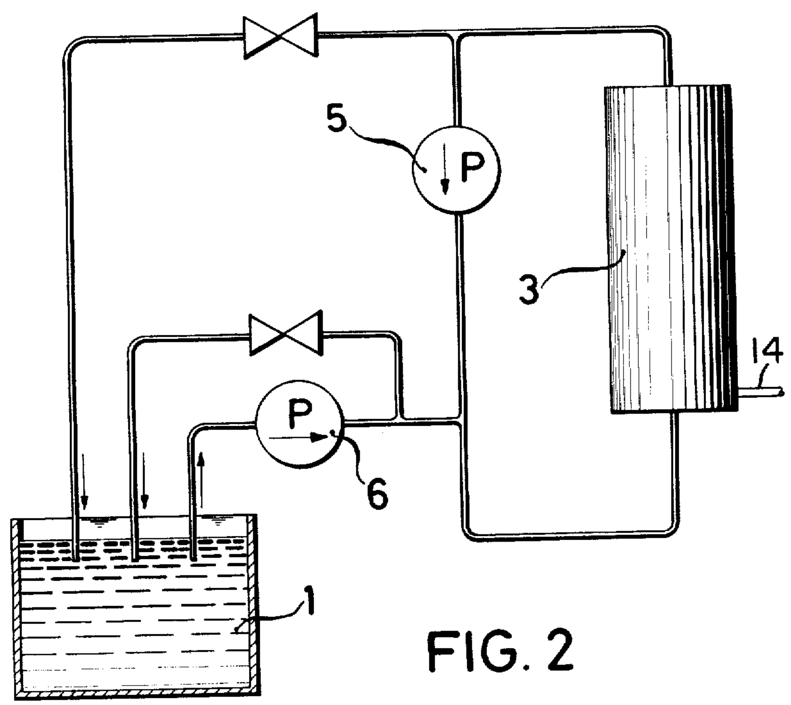
FIG. 2 is a schematic illustration of a closed high pressure circuit ultra-filtration installation in accordance with the present invention.

Another preferred embodiment, which utilizes a closed high pressure circuit, is illustrated in FIG. 2. In this instance, a circulation pump 5 receives the crude solution leaving the outlet of the modules 3 and applies it at the desired pressure to the inlet for the module 3 for the crude solution. The pump 5 only needs to overcome the flow resistance of the high pressure circuit. In addition, additional or make-up crude solution is taken from tank 1 by a second pump 6 and is added to the discharge of pump 5. Pump 6 is a high pressure feed pump and only requires a limited volume capacity for compensating for the amount of material permeating through the capillaries and the amount which might be passed by a pressure regulator and returned to the tank 1.

In an economically operated high pressure ultrafiltration unit installation, the principles of the closed installation alone can be considered. The plant according to this principle allows energy consumptions to be reduced with an optimal exploitation of all parameters to the order of magnitude of the present day low pressure installations of the same permeate or filtrate capacity.

Two important criteria must be taken into consideration: first, the pressure drop in the closed circuit in which the modules are located must be small in relation to the installation system pressure, which can be as high as 100 bars at least; and the second consideration is the crude solution volume forwarded in the circuit must be considerable in relation to the permeate or filtrate volume. for example, the yield related to the volume flow and the circuit must be low.

Mathematically, the following relationships occur between the ratio of the capacity requirement of an open circuit plant $P_1$ compared with a closed circuit plant $P_2$. The relationship is:

$$\frac{P_1}{P_2} = \frac{1}{\frac{V_2}{V_1} + \frac{\Delta P_{Kr}}{\Delta P_{Syst}}}$$

wherein:

$P_1$=the energy consumption of the open circuit plant;
$P_2$=the energy consumption of the closed circuit plant;
$V_2$=the permeate volume;
$V_1$=the circuit volume;
$V_2/V_1$=yield;
$\Delta P_{Kr}$=pressure loss in the circuit; and
$\Delta P_{Syst}$=the plant systems pressure.

Figure 3:
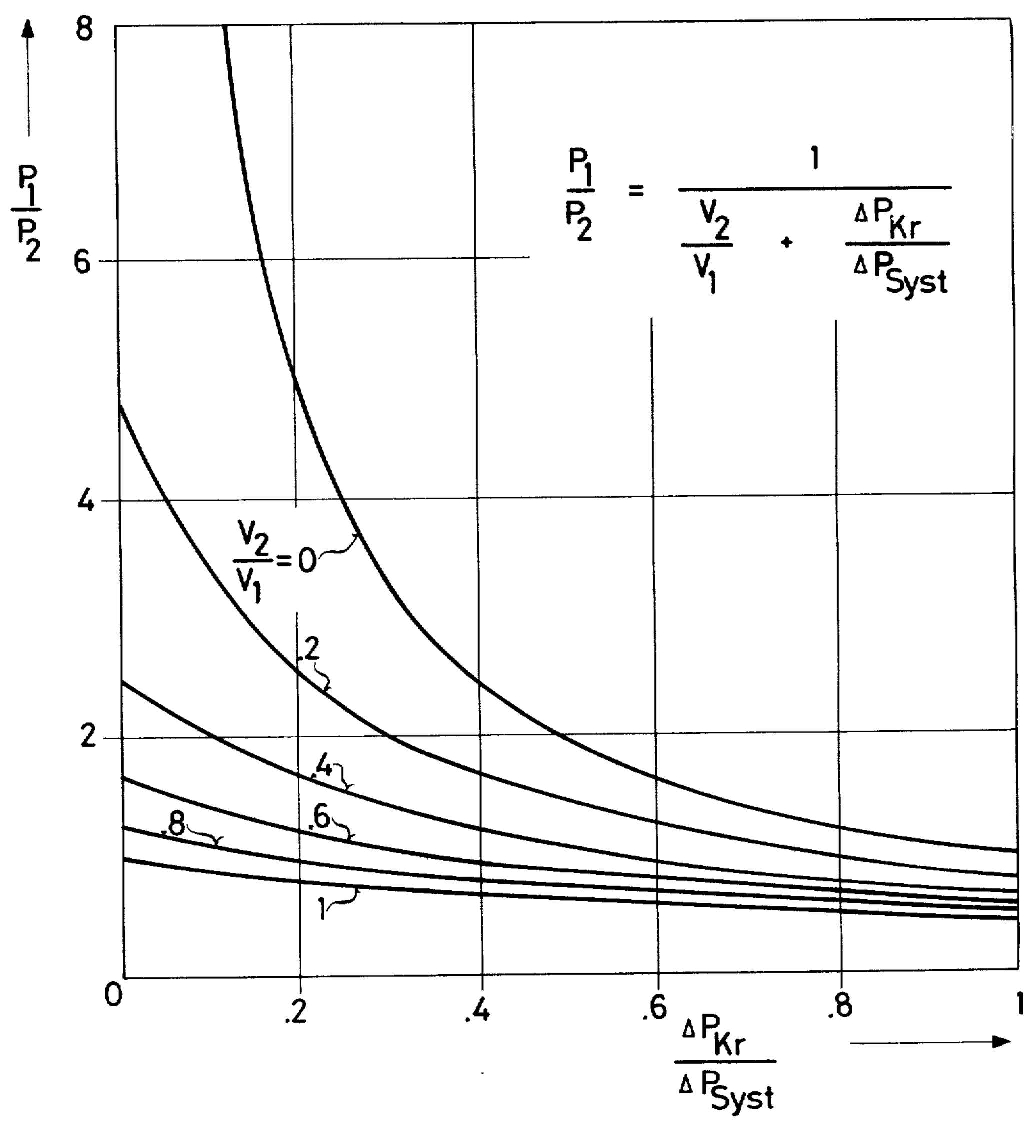
FIG. 3 is a graph showing the relationship of the ratio of the capacity of the open circuit plant to a closed circuit plant in relation to the pressure loss in the circuit and plant systems for various yields.

The functional relationship of $P_1/P_2$ is shown in accordance with the $\Delta P_{Kr}/\Delta P_{Syst}$ in FIG. 3. The same FIG. 3 also shows the two criteria referred to previously wherein the closed circuit installation is superior to an open circuit installation.

High pressure ultra-filtration installations have the advantage over previously used low pressure installations in that as a result of the greater system pressure, a greater permeate rate is obtained and thus a smaller installation can be used. In addition, a greater degree of freedom is allowed in the hydrodynamic design of the plant and of the module while still achieving turbulent flow in the module without difficulty and with a considerable reduction of the diaphragm fouling risk. In addition, the intermediate apparent and decidedly greater energy requirements can be eliminated by suitable design of the installation as mentioned hereinabove.

EXAMPLE 1

High pressure ultra-filtration installation for oil emulsion separation: Plant with closed high pressure circuit:

permeate capacity: 5 $m^3$/d
module diameter: 20 mm
module total length: 8 m
installed capacity: 8.9 kW
utilized capacity: 4 kW

EXAMPLE 2

High pressure ultra-filtration test installation with 9 mm diameter laboratory module measuring 40 cm long. Diaphragms permeated externally in the module; and a turbulent crude solution flow in the module:

emulsion: 4% Shell Dromus B emulsion
diaphragm permeability: 1.2 $l/m^2$ h bar
permeate heavy oil content: 3–4 ppm Although various minor modifications may be suggested by those versed in the art, it should be understood that we wish to embody within the scope of the patent granted hereon, all such modifications as reasonably and properly come within the scope of our contribution to the art.

We claim:

1. An apparatus for a high pressure ultra-filtration of a permeate from a crude solution at a pressure of 100 bars comprising a module; a plurality of pressure stable porous glass capillary diaphragms being stable at a pressure of 100 bars as a main filtration element; means for holding the glass capillary diaphragms in said module to extend parallel to one another, said means for holding including a pressure stable encapsulated holder having a pressure tight connection with said capillary diaphragms at one end and including an outlet in communication with the interior of each of the capillary diaphragms, said module having an inlet for the crude solution and an outlet for the crude solution being arranged on the module with the flow of the crude solution being a turbulent flow parallel to and along the outside of each of the porous glass capillary diaphragms with the permeate passing from the exterior to the interior of each of the capillary diaphragms and to the outlet in communication therewith; and means for creating a flow pressure gradient on the crude material being supplied to the module.

2. An apparatus according to claim 1, wherein the porous glass capillaries have a chemical surface modification.

3. An apparatus according to claim 1, wherein the outer diameter of the porous glass capillaries is between 200 $\mu$m and 5000 $\mu$m.

4. An apparatus according to claim 1, wherein the means for holding of the capillary diaphragms only secures one end of the capillary diaphragms in the module, the other end of each of the capillary diaphragms being closed so that the other end is able to freely move within the flow of the crude solution in the module.

5. An apparatus according to claim 1, wherein the means for applying a pressure comprises a closed high pressure circuit installation extending between the inlet and outlet for the crude solution.

6. An apparatus according to claim 1, wherein said means for applying a pressure include a closed high pressure circuit having a pump extending between the inlet and outlet for the crude solution and a feed pump for compensating for the amount of material permeating through the capillary diaphragm.

7. An apparatus according to claim 6, wherein the capillary diaphragm comprises glass capillaries having an outer diameter of between 200 $\mu$m and 5000 $\mu$m, each of said capillaries having a chemical surface modification.

8. An apparatus according to claim 1, wherein the pressure stable encapsulated holder positions each of the capillary diaphragms in the module in such a manner that they are the same distance from each other and from the wall of the module so that an equal cross-section is achieved throughout the entire length of the module between the capillary diaphragm.

* * * * *